United States Patent
Gao et al.

(10) Patent No.: US 12,384,344 B2
(45) Date of Patent: Aug. 12, 2025

(54) PRESSURE CONTROL METHOD AND PRESSURE CONTROL DEVICE FOR BRAKING CYLINDER OF RAIL VEHICLE, AND RAIL VEHICLE

(71) Applicant: CRRC TANGSHAN CO., LTD., Tangshan (CN)

(72) Inventors: Shan Gao, Tangshan (CN); Chunjie Xie, Tangshan (CN); Jiaying Qin, Tangshan (CN); Congxi Wen, Tangshan (CN); Huaming Li, Tangshan (CN); Jianquan Liang, Tangshan (CN); Zhenhong Wang, Tangshan (CN); Hongmei Xu, Tangshan (CN); Xiaolei Wang, Tangshan (CN); Liming Shang, Tangshan (CN); Xuansheng Chen, Tangshan (CN)

(73) Assignee: CRRC TANGSHAN CO., LTD., Tangshan (CN)

( * ) Notice: Subject to any disclaimer, the term of this patent is extended or adjusted under 35 U.S.C. 154(b) by 413 days.

(21) Appl. No.: 18/187,978

(22) Filed: Mar. 22, 2023

(65) Prior Publication Data
US 2023/0219548 A1 Jul. 13, 2023

Related U.S. Application Data

(63) Continuation of application No. PCT/CN2020/126917, filed on Nov. 6, 2020.

(30) Foreign Application Priority Data

Sep. 27, 2020 (CN) .......................... 202011033146.8

(51) Int. Cl.
*B60T 8/17* (2006.01)
*B60T 8/171* (2006.01)
(Continued)

(52) U.S. Cl.
CPC ........... *B60T 11/101* (2013.01); *B60T 8/1705* (2013.01); *B60T 8/171* (2013.01); *B60T 13/26* (2013.01);
(Continued)

(58) Field of Classification Search
CPC ........ B60T 8/1705; B60T 8/171; B60T 8/174; B60T 11/101; B60T 13/26; B60T 13/665;
(Continued)

(56) References Cited

U.S. PATENT DOCUMENTS

2013/0261857 A1* 10/2013 Matsuyama .......... B60T 13/665
 701/19
2018/0056952 A1* 3/2018 Ono ...................... B60T 8/3225
(Continued)

FOREIGN PATENT DOCUMENTS

CN 201923122 U 8/2011
CN 202911724 U 5/2013
(Continued)

OTHER PUBLICATIONS

WO2018007187 (Year: 2018).*
(Continued)

*Primary Examiner* — Thomas J Williams
(74) *Attorney, Agent, or Firm* — Westbridge IP LLC (57) ABSTRACT

Disclosed are a pressure control method and a pressure control device for a braking cylinder of a rail vehicle, and the rail vehicle. The method includes the following steps: acquiring the air charge-release volume of the braking cylinder of the rail vehicle and the air flowrate of the braking cylinder; determining the charge-release duration according to the air charge-release volume of the braking cylinder and the air flowrate of the braking cylinder, and controlling the charge-release working duration of the air charge-release solenoid valve according to the air charge-release duration;
(Continued)

```
┌─────────────────────────────────────────────────────────────┐
│ acquiring an air charge-release volume of the braking       │
│ cylinder of the rail vehicle and an air flowrate of the     │
│ braking cylinder                                            │
└─────────────────────────────────────────────────────────────┘
                            │  S101
                            ▼
┌─────────────────────────────────────────────────────────────┐
│ determining an air charge-release duration according to    │
│ the air charge-release volume of the braking cylinder and   │
│ the air flowrate of the braking cylinder, and controlling a │
│ charge-release working duration of an air charge-release   │
│ solenoid valve according to the air charge-release duration │
└─────────────────────────────────────────────────────────────┘
                            │  S102
                            ▼
┌─────────────────────────────────────────────────────────────┐
│ in a case where the charge-release working duration of the │
│ air charge-release solenoid valve reaches the charge-      │
│ release duration, acquiring a predictive pressure of the   │
│ braking cylinder, and controlling a working state of the   │
│ air charge-release solenoid valve according to the         │
│ predictive pressure                                         │
└─────────────────────────────────────────────────────────────┘
                               S103
``` when the working duration of the air charge-release solenoid valve reaches the charge-release duration, acquiring the predictive pressure of the braking cylinder, and controlling the working state of the air charge-release solenoid valve according to the predictive pressure.

18 Claims, 8 Drawing Sheets

(51) Int. Cl.
| | |
|---|---|
| *B60T 11/10* | (2006.01) |
| *B60T 13/26* | (2006.01) |
| *B60T 13/66* | (2006.01) |
| *B60T 13/68* | (2006.01) |
| *B60T 15/02* | (2006.01) |
| *B60T 17/22* | (2006.01) |

(52) U.S. Cl.
CPC .......... *B60T 13/665* (2013.01); *B60T 13/683* (2013.01); *B60T 15/027* (2013.01); *B60T 17/228* (2013.01)

(58) Field of Classification Search
CPC ...... B60T 13/683; B60T 15/027; B60T 15/54; B60T 17/228
See application file for complete search history.

(56) References Cited

U.S. PATENT DOCUMENTS

| | | | |
|---|---|---|---|
| 2019/0241162 A1* | 8/2019 | Hartl | B60T 8/174 |
| 2022/0073044 A1* | 3/2022 | Lucarelli | B60T 13/683 |
| 2023/0219548 A1* | 7/2023 | Gao | B60T 8/171 |
| | | | 188/151 R |

FOREIGN PATENT DOCUMENTS

| | | |
|---|---|---|
| CN | 105564402 A | 5/2016 |
| CN | 105564403 A | 5/2016 |
| CN | 109383554 A | 2/2019 |
| EP | 3473517 A1 | 4/2019 |
| WO | WO-2018007187 A1 * 1/2018 | ............ B60T 8/1705 |

OTHER PUBLICATIONS

First Office Action issued in counterpart Chinese Patent Application No. 202011033146.8, dated Apr. 25, 2021.
International Search Report issued in corresponding PCT Application No. PCT/CN2020/126917, dated Jun. 24, 2021.
Written Opinion issued in corresponding PCT Application No. PCT/CN2020/126917, dated Jun. 24, 2021.

* cited by examiner

PRESSURE CONTROL METHOD AND PRESSURE CONTROL DEVICE FOR BRAKING CYLINDER OF RAIL VEHICLE, AND RAIL VEHICLE

CROSS REFERENCE OF RELATED APPLICATION

This application is a continuation of International Application No. PCT/CN2020/126917, filed on Nov. 6, 2020, which claims priority to Chinese Patent Application No. CN 202011033146.8, filed on Sep. 27, 2020, the contents of which are incorporated herein by reference in their entireties.

TECHNICAL FIELD

The present disclosure relates to rail vehicle technology, and more particularly to a pressure control method and a pressure control device for a braking cylinder of a rail vehicle, and the rail vehicle.

BACKGROUND

The braking system of a rail vehicle has the functions of common braking, emergency braking, fast braking, holding braking, etc. The common braking is in a manner of electro-pneumatic hybrid braking, which is cooperated by electric braking and air braking. The electric braking is employed with priority, and the air braking is supplemented to operate when the electric braking is insufficient. In a case of low speed, emergency, and electric braking failure, it is necessary to apply air braking completely, and the performance of the air braking has an important effect on the performance of the whole vehicle.

In related arts, the braking system commonly controls the air charge-release solenoid valve with a PWM signal and PID control method. Firstly, the difference between the acquisition pressure value from the sensor and the set pressure value is determined. If the difference exceeds the predetermined error range, the error is input to the PID controller to acquire the control output, and the duty cycle is calculated by the linear mapping function. Finally, the PWM signal is output to control the braking solenoid valve and the release solenoid valve to adjust the pressure of the volume chamber.

However, due to the delay effect of the braking air pipeline system, the pressure of the braking cylinder lags in response, which easily leads to excessive overshoot by the method of the related arts, causing frequent adjustment of the solenoid valve.

SUMMARY

The embodiment of the present disclosure provides a pressure control method and a pressure control device for a braking cylinder of a rail vehicle, and the rail vehicle, which overcomes the problem of excessive overshoot and frequent adjustment of the solenoid valve easily caused by adjusting the pressure of the braking cylinder in the related arts.

A first aspect of the embodiment of the present disclosure provides a pressure control method for a braking cylinder of a rail vehicle, including:
  acquiring an air charge-release volume of a braking cylinder and an air flowrate of the braking cylinder;
  determining an air charge-release duration according to the air charge-release volume of the braking cylinder and the air flowrate of the braking cylinder, and controlling a charge-release working duration of an air charge-release solenoid valve according to the air charge-release duration;
  in a case where the charge-release working duration of the air charge-release solenoid valve reaches the charge-release duration, acquiring a predictive pressure of the braking cylinder, and controlling a working state of the air charge-release solenoid valve according to the predictive pressure.

A second aspect of the embodiment of the present disclosure provides a pressure control device for a braking cylinder of the rail vehicle, including:
  an acquiring module, configured to acquire an air charge-release volume of a braking cylinder of the rail vehicle and an air flowrate of the braking cylinder;
  a first controlling module, configured to determine an air charge-release duration according to the air charge-release volume of the braking cylinder and the air flowrate of the braking cylinder, and control a charge-release working duration of an air charge-release solenoid valve according to the air charge-release duration;
  a second controlling module, configured to, in a case where the charge-release working duration of the air charge-release solenoid valve reaches the charge-release duration, acquire a predictive pressure of the braking cylinder, and control a working state of the air charge-release solenoid valve according to the predictive pressure.

A third aspect of the embodiment of the present disclosure provides a rail vehicle including a braking cylinder and a pressure control device as described, and the pressure control device is connected with the braking cylinder.

The embodiment of the present disclosure provides a pressure control method and a pressure control device for a braking cylinder of a rail vehicle, and the rail vehicle, by controlling the pressure of the braking cylinder in stages, firstly controlling the charge-release working duration of the air charge-release solenoid valve according to the determined charge-release duration, then controlling the working state of the air charge-release solenoid valve according to the predictive pressure, which realizes the accurate pressure control of the braking cylinder, which is beneficial to prevent the problem of excessive overshoot. Therefore, it can not only improve the response speed of the braking system and the stability of the braking distance, but also reduce the opening-closing frequency of the solenoid valve and prolong the service life of the solenoid valve.

BRIEF DESCRIPTION OF THE DRAWINGS

The drawings illustrated herein serve to provide a further understanding of and constitute a part of this present disclosure, and the illustrative embodiments of this present disclosure and the description thereof are used to explain this present disclosure and are not unduly limiting. In the drawings.

DETAILED DESCRIPTION OF THE EMBODIMENTS

In order to clarify the technical solutions and advantages of the embodiments of the present disclosure, the following further detailed description of the exemplary embodiments of the present disclosure is given in conjunction with the accompanying drawings, and it is apparent that the described embodiments are only a part of the embodiments of the present disclosure, and are not exhaustive of all embodiments. It should be noted that the embodiments in the present disclosure and the features in the embodiments can be combined with each other without conflict.

In related arts, the braking system commonly controls the air charge-release solenoid valve with a PWM signal and in the PID control method. Firstly, the difference between the acquisition pressure value from the sensor and the set pressure value is determined. If the difference exceeds the predetermined error range, the error is input to the PID controller to acquire the control output, and the duty cycle is calculated by the linear mapping function. Finally, the PWM signal is output to control the braking solenoid valve and the release solenoid valve to adjust the pressure of the volume chamber. However, due to the delay effect of the braking air pipeline system, the pressure of the braking cylinder lags in response, which leads to excessive overshoot and frequent adjustment of the solenoid valve. The response time accuracy and stable braking distance of the system cannot be guaranteed. The solenoid valve is operated frequently, and the solenoid valve is operated many times in each pressure sampling period, which will reduce the service life of the solenoid valve.

In order to overcome the above problems, the embodiment of the present disclosure provides a pressure control method and a pressure control device for a braking cylinder of a rail vehicle, and the rail vehicle, by controlling the pressure of the braking cylinder in stages, firstly controlling the charge-release working duration of the air charge-release solenoid valve according to the determined charge-release duration, then controlling the working state of the air charge-release solenoid valve according to the predictive pressure, which realizes the accurate pressure control of the braking cylinder, which is beneficial to prevent the problem of excessive overshoot. Therefore, it can not only improve the response speed of the braking system and the stability of the braking distance, but also reduce the opening-closing frequency of the solenoid valve and prolong the service life of the solenoid valve.

The function and realization process of the pressure control method for the braking cylinder of the rail vehicle provided in the embodiment are illustrated with reference to the accompanying drawings.

Figure 1:
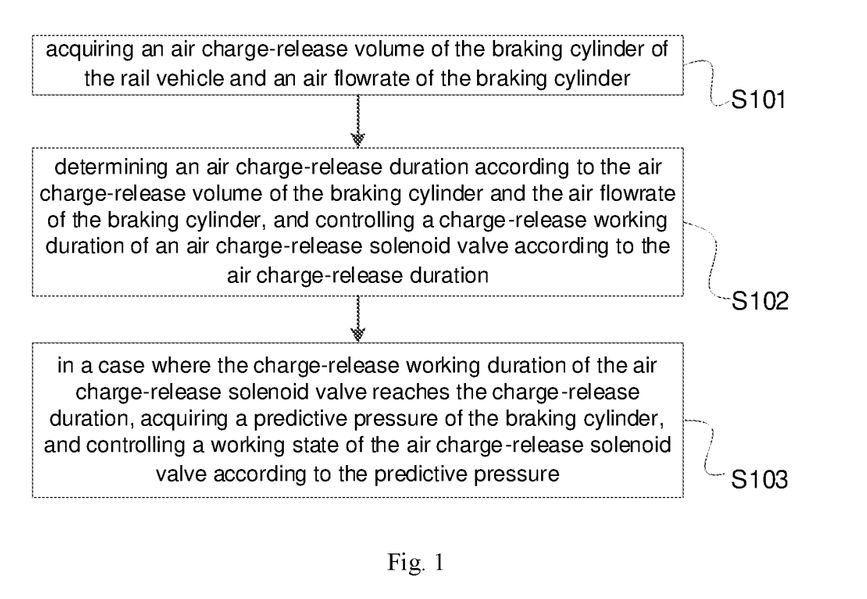
FIG. 1 is a flow diagram according to a method provided by an embodiment.

As shown in FIG. 1, the pressure control method for the braking cylinder of the rail vehicle provided by the embodiment includes:

S101, acquiring an air charge-release volume of the braking cylinder of the rail vehicle and an air flowrate of the braking cylinder;

S102, determining an air charge-release duration according to the air charge-release volume of the braking cylinder and the air flowrate of the braking cylinder, and controlling a charge-release working duration of an air charge-release solenoid valve according to the air charge-release duration;

S103, in a case where the charge-release working duration of the air charge-release solenoid valve reaches the charge-release duration, acquiring a predictive pressure of the braking cylinder, and controlling a working state of the air charge-release solenoid valve according to the predictive pressure.

In step S101, the air charge-release volume of the braking cylinder is determined according to the pre-established air charge-release volume model, the acquired ambient temperature of the braking cylinder and the initial pressure of the braking cylinder.

The air flowrate of the braking cylinder is determined according to the pre-established air flowrate model, the acquired pressure of the braking cylinder and the total air duct pressure.

The air charge-release volume model and the air flowrate model can be pre-established by simulation.

The establishing process of the air charge-release volume model can be as follows: by model simulation and calculation, a large number of curves between the air charge-release volume of the braking cylinder and the pressure variation of the braking cylinder are acquired under different ambient temperatures and initial air pressure. BP neural network training is employed to fit the neural network model between the air charge-release volume of the braking cylinder, the ambient temperature, the initial air pressure and the pressure variation of the braking cylinder.

Specifically, the model of connecting an air pressure source and the pneumatic cylinder through a flowmeter and the model of connecting the pneumatic cylinder and the atmosphere through a flowmeter are established by simulation software, and the volume of the pneumatic cylinder is the same as the volume of braking cylinder of the rail vehicle. In the model of connecting the air pressure source and the pneumatic cylinder, the flowmeter measures the flowrate and integrates the flow rate to acquire the air charge volume. The initial pressure of the pneumatic cylinder is set to 0, the pressure of the air pressure source is set to 6 bar, and the ambient temperature is set to T1. The curve of the pneumatic cylinder pressure and time and the curve of the air charge volume of the pneumatic cylinder and time under different ambient temperatures during the process of the pneumatic cylinder pressure rising from 0 bar to 6 bar are acquired by simulation. Taking a certain air pressure P1 in the pneumatic cylinder pressure curve as the initial pressure, taking the pneumatic cylinder pressure variation as the abscissa, and taking the air charge volume of the pneumatic cylinder as the ordinate, the curve relationship between the air charge volume of the pneumatic cylinder and the air pressure variation during the process of the pneumatic cylinder pressure rising at the ambient temperature T1 and the initial air pressure P1 is acquired, and the curve is in the first quadrant. In the model of connecting the pneumatic cylinder and the atmosphere, the initial pressure of the pneumatic cylinder is set to 6 bar, and the ambient temperature is set to T1. The curve of the pneumatic cylinder pressure and time and the curve of the air charge volume of the pneumatic cylinder (which is negative at this time) and time under different ambient temperatures during the process of the pneumatic cylinder pressure dropping from 6 bar to 0 bar are acquired by simulation. Taking a certain air pressure P1 in the pneumatic cylinder pressure curve as the initial pressure, taking the pneumatic cylinder pressure variation as the abscissa, and taking the air charge volume of the pneumatic cylinder as the ordinate, the curve relationship between the air charge volume of the pneumatic cylinder and the air pressure variation during the process of the pneumatic cylinder pressure dropping at the ambient temperature T1 and the initial air pressure P1 is acquired, and the curve is in the third quadrant. By combining the above two curves, a whole curve can be acquired, that is, the curve between the air flowrate of the pneumatic cylinder and the pneumatic cylinder pressure variation at the ambient temperature T1 and the initial air pressure P1.

By traversing different ambient temperatures and different initial pneumatic cylinder pressure with a certain step length, the curves between the air flowrate of the pneumatic cylinder and the pneumatic cylinder pressure variation under different ambient temperatures and different initial pressures can be acquired.

The traversal curves are finite. By using the finite curves and neural network fitting method, the relationship between the air flowrate of the pneumatic cylinder, the ambient temperature, initial air pressure and the pneumatic cylinder pressure variation can be acquired, and the air flowrate of the pneumatic cylinder can be calculated under any ambient temperature, initial air pressure and the pneumatic cylinder pressure variation.

Figure 2A:
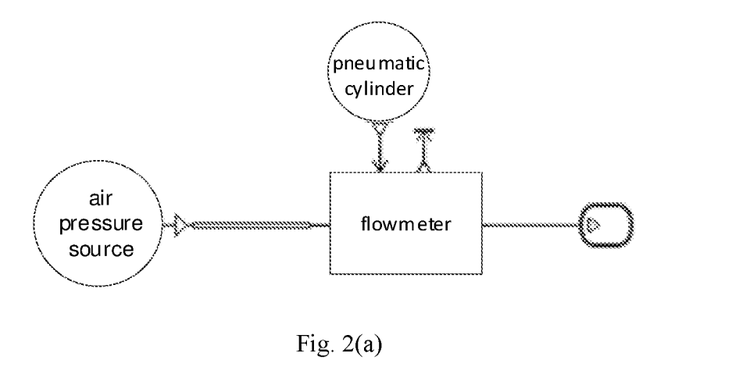
FIG. 2(a) and FIG. 2(b) are respectively schematic diagrams according to connection models of the pneumatic cylinder provided by the embodiment.
Figure 2B:
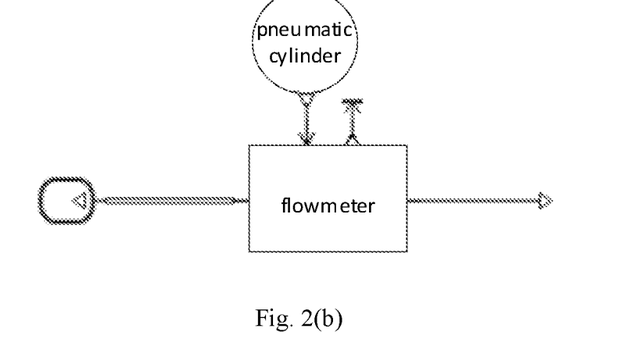
Figure 3A:
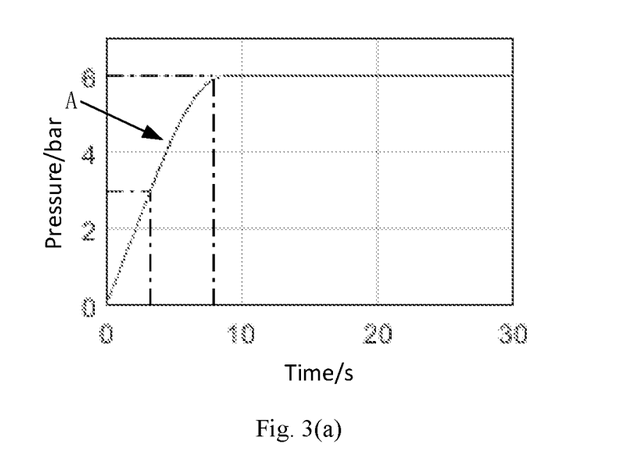
FIG. 3(a) to FIG. 3(d) are curve diagrams according to pressure and air charge volume of pneumatic cylinder provided by the embodiment.
Figure 3B:
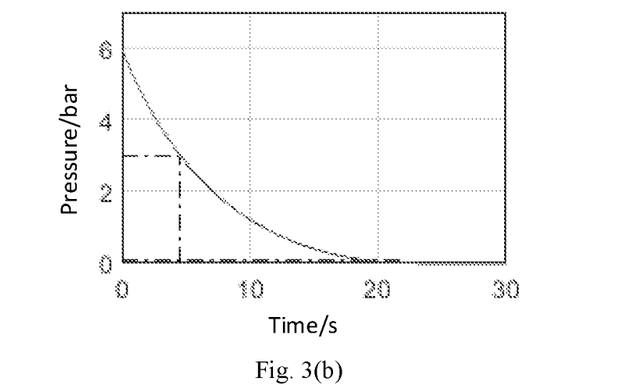
Figure 3C:
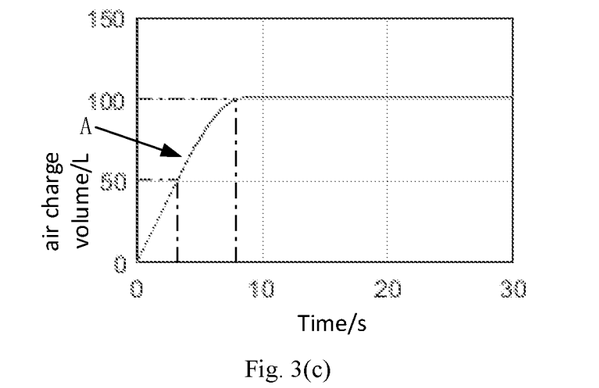
Figure 3D:
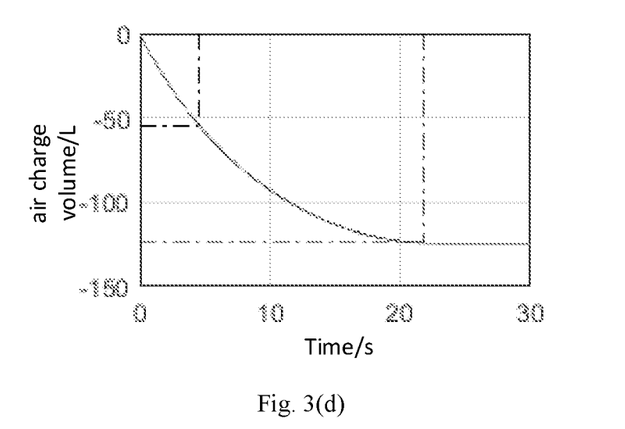
Figure 4A:
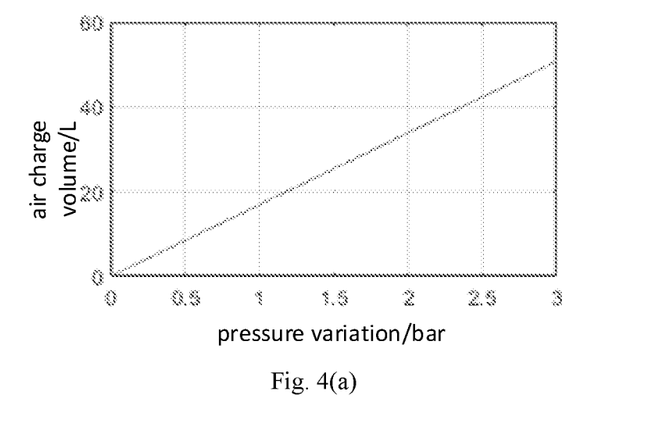
FIG. 4(a) and FIG. 4(b) are respectively curve diagrams according to air charge volume and air pressure variation of pneumatic cylinder provided by the embodiment.
Figure 4B:
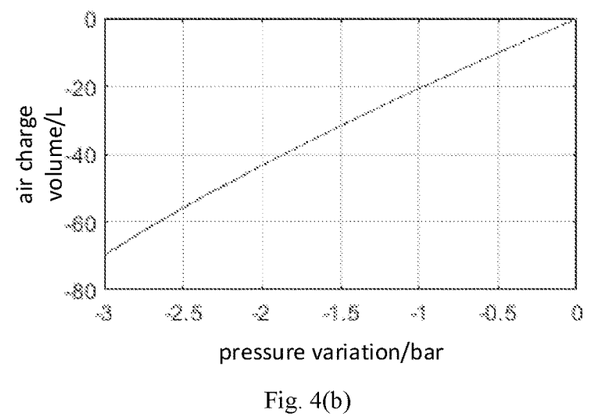
Figure 5:
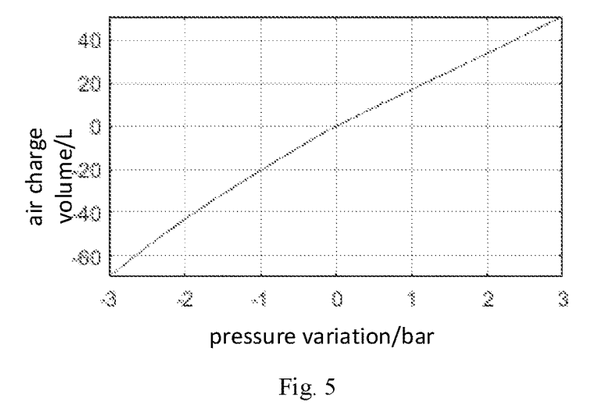
FIG. 5 is a curve diagram according to air charge volume and air pressure variation of pneumatic cylinder at 20° C. and initial pressure of 3 bar provided by the embodiment.

BP neural network method is configured to train, and the configuration is as follows:
Input layer: the number of input nodes is 3, which are the ambient temperature, initial air pressure and the pneumatic cylinder pressure variation respectively;
Hidden layer number: taking the hidden layer number in the range of [n+1, 3n+1] (n is the number of input nodes), that is, taking the value in [4, 10] as the hidden layer number, respectively training the neural networks, and taking the one with the minimum error as the final hidden layer number;
The number of hidden layer nodes: taking the number of nodes as sqrt(n+1)+a, and a∈[1, 10], that is, taking the value in [3, 12] as the number of nodes, respectively training the neural networks, and taking the one with the minimum error as the final number of hidden layer nodes;
The output layer is the air flowrate of the pneumatic cylinder;
The hidden layer activation function is selected as the hyperbolic tangent function;
The output layer activation function is selected as the linear function.
For example:
Specifically, the model of connecting the air pressure source and the pneumatic cylinder through a flowmeter and the model of connecting the pneumatic cylinder and the atmosphere through a flowmeter are established by simulation software, as shown in FIG. 2(a) and FIG. 2(b), and the volume of the pneumatic cylinder is the same as the volume of the braking cylinder of the rail vehicle. In the model of connecting the air pressure source and the pneumatic cylinder, the flowmeter measures the flowrate and integrates the flow rate to acquire the air charge volume. The initial pressure of the cylinder is set to 0, the pressure of the air pressure source is set to 6 bar, and the ambient temperature is set to 20° C. The curve of the pneumatic cylinder pressure and time and the curve of the air charge volume of the pneumatic cylinder and time during the process of the pneumatic cylinder pressure rising from 0 bar to 6 bar are acquired by simulation, as shown in FIG. 3(a) and FIG. 3(c). Selecting the middle part of the curve in the diagram (that is, the A part in the diagram), taking 3 bar in the pneumatic cylinder pressure curve as the initial pressure, taking the rising variation of the pneumatic cylinder pressure as the abscissa, and taking the air charge volume of the pneumatic cylinder as the ordinate, the curve relationship between the air charge volume of the pneumatic cylinder and the air pressure variation during the process of the pneumatic cylinder pressure rising at 20° C. and the initial air pressure as 3 bar is acquired, and the curve is in the first quadrant as shown in FIG. 4(a). In the model of connecting the pneumatic cylinder and the atmosphere, the initial pressure of the pneumatic cylinder is set to 6 bar, and the ambient temperature is set to 20° C. The curve of the pneumatic cylinder pressure and time and the curve of the air charge volume of the pneumatic cylinder and time during the process of the pneumatic cylinder pressure dropping from 6 bar to 0 bar are shown in FIG. 3(b) and FIG. 3(d). Taking 3 bar in the pneumatic cylinder pressure curve as the initial pressure, taking the dropping variation of cylinder pressure as the abscissa, and taking the air charge volume of the pneumatic cylinder as the ordinate, the curve relationship between the air charge volume of the pneumatic cylinder and the air pressure variation in the process of the pneumatic cylinder pressure dropping at 20° C. and the initial air pressure as 3 bar is acquired, and the curve is in the third quadrant as shown in FIG. 4(b). FIG. 5 is acquired by drawing FIG. 4(a) and FIG. 4(b) under the same coordinate axis, that is, the curve relationship between the air charge-release volume of the braking cylinder and the pressure variation of the braking cylinder under the working condition of the ambient temperature of 20 degrees Celsius and the initial air pressure of 3 bar.

By traversing different ambient temperatures and different pneumatic cylinder initial pressures with a certain step length, the curves between the air flowrate of the pneumatic cylinder and the pneumatic cylinder pressure variation under different ambient temperatures and different initial pressures can be acquired to be fitted by neural network training.

BP neural network method is configured to train, and the configuration is as follows:
Input layer: the number of input nodes is 3, which are the ambient temperature, initial air pressure and the pneumatic cylinder pressure variation respectively;
Hidden layer number: Taking the hidden layer number in the range of [n+1, 3n+1] (n is the number of input nodes), that is, taking the value in [4, 10] as the hidden layer number, respectively training the neural networks, and taking the one with the minimum error as the final hidden layer number;
The number of hidden layer nodes: taking the number of nodes as sqrt (n+1)+a, and a∈[1, 10], that is, take the value in [3, 12] as the number of nodes, respectively training the neural networks, and taking the one with the minimum error as the final number of hidden layer nodes;

The output layer is the air flowrate of the pneumatic cylinder;

The hidden layer activation function is selected as the hyperbolic tangent function;

The output layer activation function is selected as the linear function.

The number of hidden layers can be selected in 7 different situations, and the number of hidden layer nodes can be selected in 10 different situations, with a total of 70 training situations. After training, for example, the model with the number of hidden layers of 5 and the number of hidden layer nodes of 3 has minimum errors. Therefore, the model with 5 hidden layers and 3 hidden layer nodes may be employed as one of the final fitting neural network models.

The establishing process of the air flowrate model can be as follows: the relationship between air flowrate of the braking cylinder, pressure of the braking cylinder and total air duct pressure can be determined by model simulation and experimental adjustment: 1) Air charging process: a simulation model is established according to the air charging pipeline of a real vehicle, the air charging flowrate is acquired by simulation under different total duct pressure and different pressure of the braking cylinder, the three-dimensional curved surface with the pressure of the braking cylinder as x axis, the total duct pressure as y axis and the flow rate as z axis is acquired, the air flowrate under several typical working conditions is acquired by tests, and the three-dimensional curved surface acquired by simulation is adjusted; 2) Air releasing process: the simulation model is established according to the air releasing pipeline of the real vehicle, the air releasing flowrate under different pressure of the braking cylinders is acquired by simulation, the curve with pressure of the braking cylinder as x axis and the air releasing flowrate as y axis is acquired, and the air releasing flowrate under several typical working conditions is acquired by tests to adjust the curve. The air flowrate of the braking cylinder can be calculated according to the pressure of the braking cylinder and the total air duct pressure through the adjusted air charging curved surface and the air releasing curve.

Figure 6A:
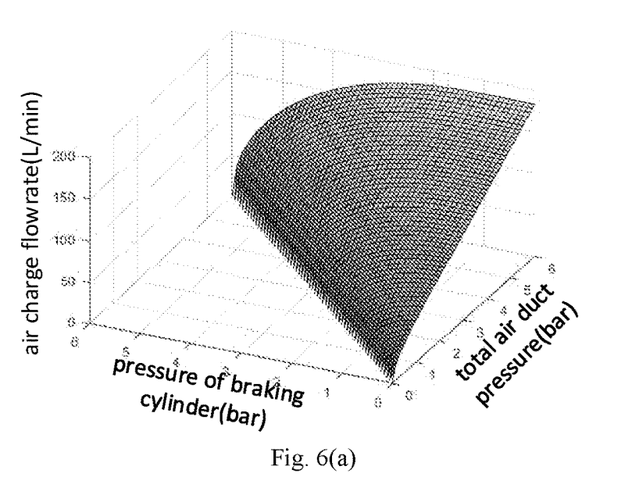
FIG. 6(a) to FIG. 6(d) are schematic diagrams according to air flowrate adjustment of braking cylinder provided by the embodiment.

For example, in the air charging process: the air flowrate surface is acquired by simulation: the simulation model is established according to the air charging pipeline of the real vehicle, the total air duct pressure is 0.1 bar, 0.2 bar . . . 6 bar, the pressure of the braking cylinder is 0.1 bar, 0.2 bar . . . , the total air duct pressure is 0.1 bar, 0.2 bar . . . , and simulating to acquire the air charging flowrate under different total air duct pressure and different pressure of the braking cylinder. And fitting to acquire a three-dimensional curved surface with pressure of the braking cylinder as x axis, the total air duct pressure as y axis and the air charging flowrate as z axis, as shown in FIG. 6(a). The boundary curve when the pressure of the braking cylinder is 0 bar and the boundary curve when total air duct pressure is 6 bar are shown in solid lines in FIG. 6(b) and FIG. 6(c) respectively (curve L1 and curve L3 above the curve with *).

Figure 6B:
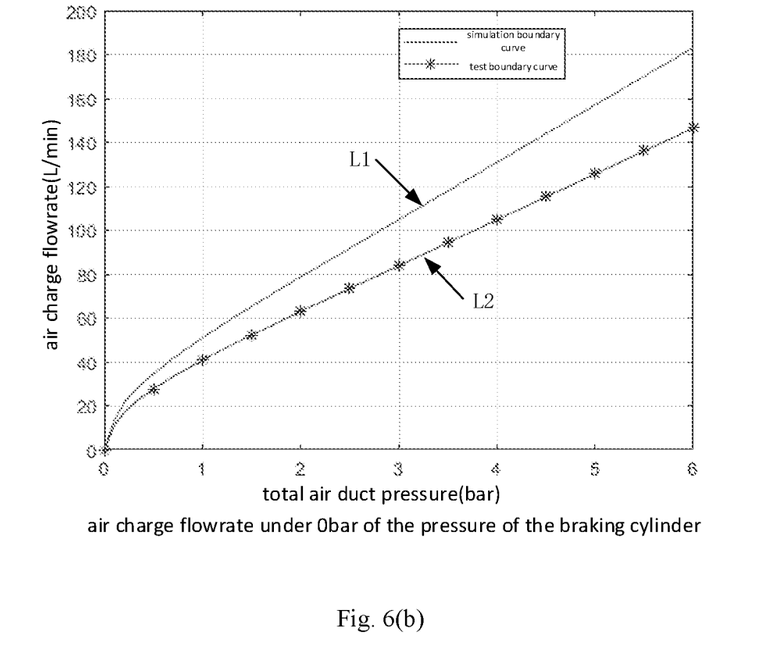
Figure 6C:
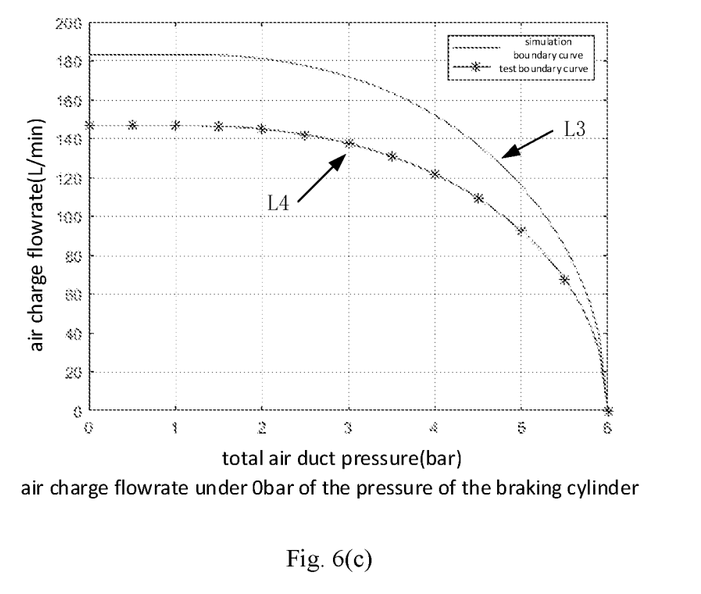
Figure 6D:
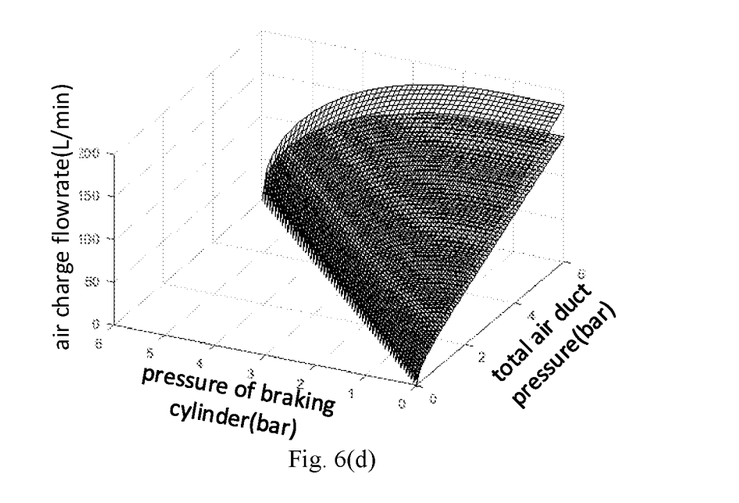

Adjusting through the test: when the pressure of the braking cylinder is 0 bar through the test, the air flowrate under different total air duct pressures is shown at the * point in FIG. 6(b), and the curve with * in FIG. 6(b) (curve L2 relatively lower) is acquired through curve fitting; when the total air duct pressure is 6 bar, the air flowrate under different the pressure of the braking cylinder is shown at the * point in FIG. 6(c), and the curve with * in FIG. 6(c) is acquired by curve fitting (curve L4 relatively lower); Adjusting the surface in FIG. 6(a) according to FIG. 6(b) and FIG. 6(c), the adjusting method is that: the total air duct pressure is x bar (x=0.1, 0.2, . . . 6 bar), the pressure of the braking cylinder is y bar (y=0.1, 0.2, . . . x), the numerical ratio of the test boundary curve and the simulation boundary curve acquired from FIG. 6(b) is kx when the total air duct pressure is xbar, the numerical ratio of the test boundary curve and the simulation boundary curve when the pressure of the braking cylinder is ybar from FIG. 6(c) is ky, and the adjustment coefficient is k=(kx+ky)/2. Multiply the adjustment coefficient by the air flowrate when the total air duct pressure and the pressure of the braking cylinder are x bar and y bar respectively in FIG. 6(a) to acquire the adjusted air flowrate. Finally, the air flowrate surfaces before and after adjusting are shown in FIG. 6(d). According to the adjusted air flowrate surface, the air charging flowrate can be calculated by the total air duct pressure and the pressure of the braking cylinder.

Figure 7:
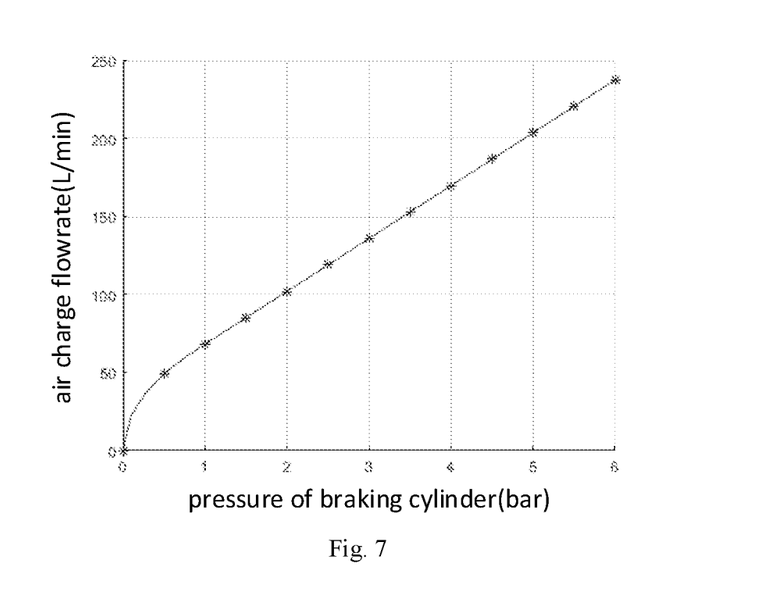
FIG. 7 is a curve diagram according to air release flowrate provided by the embodiment.

Air releasing process: the air flowrate under different pressure of the braking cylinders acquired through tests is shown at * point in FIG. 6, and the curve in FIG. 7 is acquired through curve fitting. According to the air flowrate curve, the air releasing flowrate can be calculated through the pressure of the braking cylinder.

In the step of S102, determining the air charge-release duration according to the air charge-release volume of the braking cylinder and the air flowrate of the braking cylinder, and controlling a charge-release working duration of an air charge-release solenoid valve according to the air charge-release duration. For example, the required charge-release duration can be acquired by dividing the air charge-release volume by the air flowrate of the braking cylinder. In the primary adjustment stage, the charge-release working duration of the air charge-release solenoid valve is controlled according to the acquired charge-release duration. When the actual working duration of the air charge-release solenoid valve reaches the charge-release duration, the secondary adjustment stage is operated, which is executed as step S103.

In the step of S103, in a case where the charge-release working duration of the air charge-release solenoid valve reaches the charge-release duration, acquiring a predictive pressure of the braking cylinder, and controlling a working state of the air charge-release solenoid valve according to the predictive pressure.

Acquiring the predictive pressure of the braking cylinder includes:
  acquiring a current pressure of the braking cylinder and a pressure hysteresis variation of the braking cylinder, and determining the predictive pressure of the braking cylinder according to the current pressure and the pressure hysteresis variation.

Acquiring the pressure hysteresis variation of the braking cylinder includes:
  acquiring a pressure variation slope of the braking cylinder and determining the pressure hysteresis variation according to the curve relationship between the pressure variation slope and the pressure hysteresis variation pre-established.

The predictive pressure is the stable pressure of the braking cylinder after holding pressure, and the predictive pressure=current pressure+pressure hysteresis variation. The pressure hysteresis variation is directly related to the pressure rising slope and the real vehicle pipeline. Therefore, the curve relationship f(n) between pressure hysteresis variation and slope can be acquired by real vehicle pipeline test and curve fitting, and n is the slope.

The data of multiple groups of slope n and the corresponding pressure hysteresis variation are acquired by real vehicle test, and the curve relationship f(n) is acquired by interpolation fitting. Through f(n), the pressure hysteresis variation can be calculated according to the slope, and finally the predictive pressure can be acquired.

Figure 8:
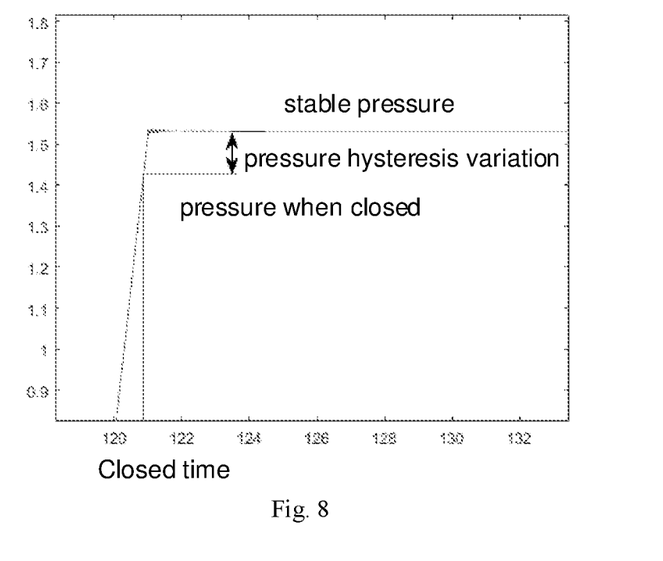
FIG. 8 is a schematic diagram according to slope and the corresponding pressure hysteresis variation provided by the embodiment.
Figure 9:
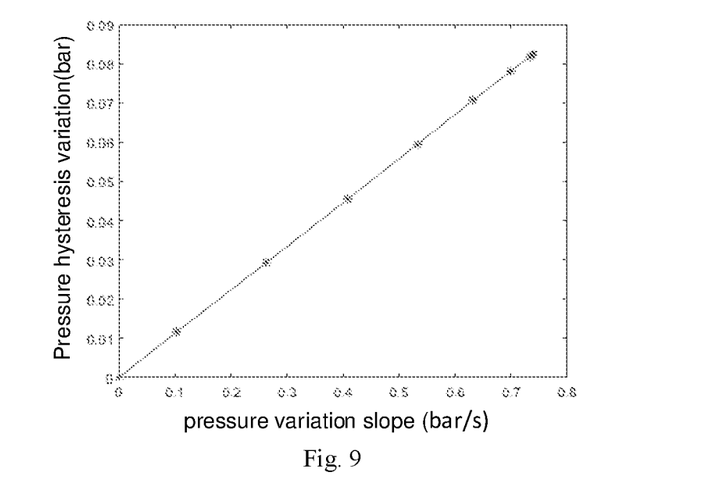
FIG. 9 is a curve diagram according to slope and pressure hysteresis variation acquired by fitting during air charging process provided by the embodiment.

The real vehicle test method is as follows:

Air charging: the initial pressure of the braking cylinder is 0, opening the air charging solenoid valve for a certain duration and then closing, and when closed, measuring the pressure of the braking cylinder, the pressure variation slope of the braking cylinder and the stable pressure of the braking cylinder. Pressure hysteresis variation=stable pressure of braking cylinder−the pressure of the braking cylinder when closed, and a set of slopes and the corresponding pressure hysteresis variation are acquired, as shown in FIG. 8. Multiple sets of data are acquired by selecting the different closing time for multiple tests, and the curves of slope and pressure hysteresis variation are acquired by fitting, as shown in FIG. 9, and * points indicate test data.

Figure 10:
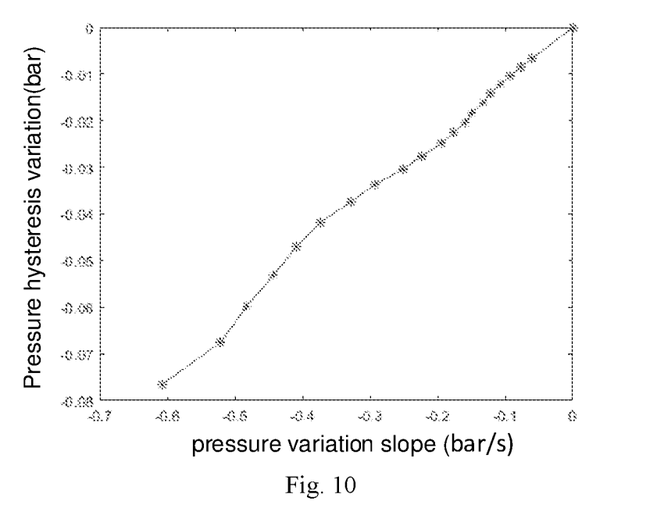
FIG. 10 is a curve diagram according to slope and pressure hysteresis variation acquired by fitting during air releasing process provided by the embodiment.

Air releasing, firstly air charging the braking cylinder to 6 bar, and the initial pressure of the braking cylinder is 0, opening the air releasing solenoid valve for a certain duration and then closing, and when closed measuring the pressure of the braking cylinder, the pressure variation slope of the braking cylinder and the stable pressure of the braking cylinder. Pressure hysteresis variation=stable pressure of braking cylinder−the pressure of the braking cylinder when closed, and a set of slopes and the corresponding pressure hysteresis variation are acquired. Multiple sets of data are acquired by selecting the different closing time for multiple tests, and the curves of slope and pressure hysteresis variation are acquired by fitting, as shown in FIG. 10, and * points indicate test data. With FIG. 9 and FIG. 10, the pressure hysteresis variation can be acquired from the pressure variation slope of the braking cylinder, thereby acquiring the predictive pressure.

After the predictive pressure is acquired, the working state of the air charge-release solenoid valve is controlled according to the predictive pressure, including:

in a case where the predictive pressure is greater than the upper limit of the dead zone range, controlling the air charge-release solenoid valve to release air until the predictive pressure is less than the pressure corresponding to the braking instruction to hold the pressure;

in a case where the predictive pressure is less than the lower limit of the dead zone range, controlling the air charge-release solenoid valve to charge air until the predictive pressure is greater than the pressure corresponding to the braking instruction to hold the pressure.

In specific implementation:

When the slope is positive and the predictive pressure is greater than the upper limit of the dead zone range: releasing air, and calculating the predictive pressure at the same time, and holding the pressure when the predictive pressure is less than the pressure instruction for the first time.

When the slope is positive and the predictive pressure is less than the lower limit of the dead zone range: charging air, and calculating the predictive pressure at the same time, and holding the pressure when the predictive pressure is greater than the pressure instruction for the first time.

When the slope is negative and the predictive pressure is greater than the upper limit of the dead zone range: releasing air, and calculating the predictive pressure at the same time, and holding the pressure when the predictive pressure is less than the pressure instruction for the first time.

When the slope is negative and the predictive pressure is less than the lower limit of the dead zone range: charging air, and calculating the predictive pressure at the same time, and holding the pressure when the predictive pressure is greater than the pressure instruction for the first time.

It should be noted that the method for determining the air charge-release volume, the air flowrate of the braking cylinder and the predictive pressure in the embodiment is not limited thereto, and the embodiment is only an example.

The embodiment provides that the charge-release duration is calculated according to the air charge-release volume and the air flowrate, and the charge-release valve is controlled to air charging or releasing; After the charge-release duration is reached, the predictive pressure is calculated according to the error of the pressure of the braking cylinder and the pressure variation slope of the braking cylinder, and the next step is to charge air, release air or hold pressure according to whether the predictive pressure enters the dead zone range of pressure instruction (also called dead zone error range). With the method, the pressure of the braking cylinder can be controlled accurately and quickly, the pressure fluctuation and the operation frequency of the air charge-release solenoid valve can be reduced, and the response speed of the brake system and the stability of the braking distance can be improved.

The embodiment also provides a pressure control device for the braking cylinder of the rail vehicle, which is a product embodiment corresponding to the aforementioned embodiment, and is identical or corresponding to the aforementioned embodiment, so the embodiment will not be repeated here.

Figure 11:
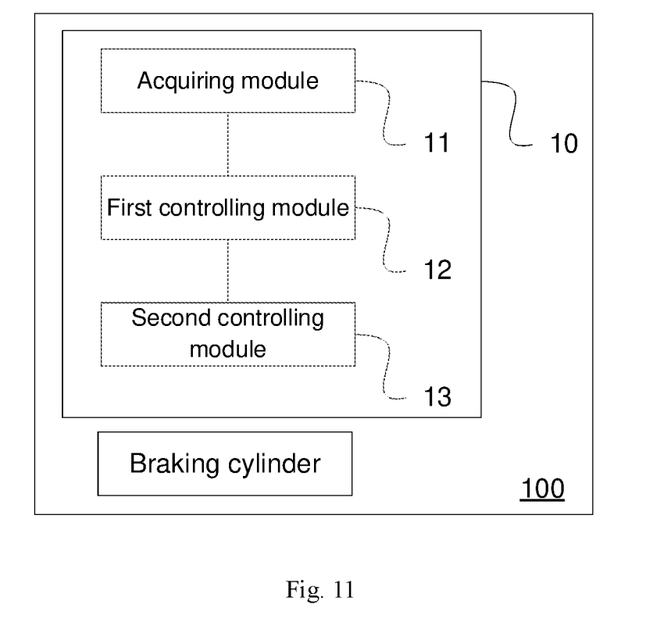
FIG. 11 is a structural block diagram according to a device provided by another embodiment.

As shown in FIG. 11, the pressure control device 10 of the braking cylinder of the rail vehicle provided in the embodiment includes:

an acquiring module 11, configured to acquire an air charge-release volume of a braking cylinder of the rail vehicle and an air flowrate of the braking cylinder;

a first controlling module 12, configured to determine an air charge-release duration according to the air charge-release volume of the braking cylinder and the air flowrate of the braking cylinder, and control a charge-release working duration of an air charge-release solenoid valve according to the air charge-release duration;

a second controlling module 13, configured to, in a case where the charge-release working duration of the air charge-release solenoid valve reaches the charge-release duration, acquire a predictive pressure of the braking cylinder, and control a working state of the air charge-release solenoid valve according to the predictive pressure.

In one alternative implementation, the acquiring module 11 is specifically configured to:

determine the air charge-release volume of the braking cylinder according to the pre-established air charge-release volume model, the acquired ambient temperature and the initial pressure of the braking cylinder.

In one alternative implementation, the acquiring module 11 is specifically configured to:

determine the air flowrate of the braking cylinder according to the pre-established air flowrate model, the acquired pressure of the braking cylinder and the total air duct pressure.

In one alternative implementation, the second controlling module 13 is specifically configured to:

acquire a current pressure and a pressure hysteresis variation of the braking cylinder, and determine the predictive pressure of the braking cylinder according to the current pressure and the pressure hysteresis variation.

In one alternative implementation, the second controlling module 13 is specifically configured to:

acquire a pressure variation slope of the braking cylinder and determine the pressure hysteresis variation according to the curve relationship between the pressure variation slope and the pressure hysteresis variation pre-established.

In one alternative implementation, the second controlling module 13 is specifically configured to:

in a case where the predictive pressure is greater than the upper limit of the dead zone range, control the air charge-release solenoid valve to release air until the predictive pressure is less than the pressure corresponding to the braking instruction;

in a case where the predictive pressure is less than the lower limit of the dead zone range, control the air charge-release solenoid valve to charge air until the predictive pressure is greater than the pressure corresponding to the braking instruction to hold the pressure.

The embodiment also provides a rail vehicle 100 including a braking cylinder of the rail vehicle and a pressure control device 10 in any of the foregoing embodiments. The function and the realization process of the pressure control device are the same as the above-mentioned embodiment and the present embodiment will not be described in detail.

It should be noted that the relative steps numeric expressions and numerical values of the components and steps set forth in these embodiments do not limit the scope of the present disclosure unless otherwise specifically stated. In all examples shown and described herein unless otherwise specified any specific value should be construed as exemplary only and not as a limitation and therefore other examples of exemplary embodiments may have different values.

The flowcharts and block diagrams in the accompanying drawings illustrate the architecture functionality and operation of possible implementations of systems methods and computer program products according to various embodiments of the present disclosure. In this regard, each block in a flow chart or block diagram may represent a unit, program segment, or part of code that contains one or more executable instructions for performing a specified logical function. It should also be noted that in some alternative implementations the functions indicated in the boxes may also occur in a different order than those indicated in the drawings. For example, two successive boxes can actually be executed substantially in parallel, or they can sometimes be executed in reverse order, depending on the functionality involved. It is also noted that each block in the block diagram and/or flow chart, and combinations of the blocks in the block diagram and/or flow chart, may be implemented in a dedicated hardware-based system that performs a specified function or action, or may be implemented in a combination of dedicated hardware and computer instructions.

Those skilled in the art will appreciate that embodiments of the present disclosure may be provided as methods systems or computer program products. Accordingly the present disclosure may take the form of an entire hardware embodiment an entirely software embodiment or an embodiment combining software and hardware aspects. Further, the present disclosure may take the form of a computer program product implemented on one or more computer-usable storage media (including, but not limited to, disk storage, CD-ROM, optical memory, etc.) containing computer-usable program code therein.

The present disclosure is described with reference to flowcharts and/or block diagrams of methods, devices (systems) and computer program products according to embodiments of the present disclosure. It should be understood that each flow and/or block in the flow chart and/or block diagram, as well as combinations of the flow and/or block in the flow chart and/or block diagram, may be implemented by computer program instructions. These computer program instructions may be provided to a processor of a general purpose computer, a special purpose computer, an embedded processor, or other programmable data processing device to generate a machine, Such that instructions executed by a processor of a computer or other programmable data processing device generate means for performing the functions specified in one or more flow charts and/or one or more blocks of a block diagram.

These computer program instructions may also be stored in a computer readable memory that directs a computer or other programmable data processing device to operate in a specific manner, The instructions stored in the computer readable memory are caused to produce an article of manufacture including instruction means that perform the functions specified in one or more flow charts and/or one or more blocks of the block diagram.

These computer program instructions may also be loaded onto a computer or other programmable data processing device, such that a series of operational steps are executed on a computer or other programmable device to produce a computer-implemented process, such that instructions executed on the computer or other programmable device provide steps for implementing the functions specified in one or more flow charts and/or one or more blocks of the block diagram.

Although the preferred embodiments of the present disclosure have been described additional variations and modifications may be made to these embodiments once the basic inventive concepts are known to those skilled in the art. Therefore, the appended claims are intended to be interpreted to encompass preferred embodiments as well as all modifications and modifications falling within the scope of the present disclosure.

Apparently those skilled in the art may make various modifications and modifications to the present disclosure without departing from the spirit and scope of the present disclosure. Thus, the present disclosure is intended to include such modifications and variations to the extent that they fall within the scope of the claims and their equivalents.

What is claimed is:

1. A pressure control method for a braking cylinder of a rail vehicle, comprising:

acquiring an air charge-release volume of a braking cylinder and an air flowrate of the braking cylinder;

determining an air charge-release duration according to the air charge-release volume of the braking cylinder and the air flowrate of the braking cylinder, and controlling a charge-release working duration of an air charge-release solenoid valve according to the air charge-release duration; and in case where the charge-release working duration of the air charge-release solenoid valve reaches the charge-release duration, acquiring a predictive pressure of the braking cylinder, and controlling a working state of the air charge-release solenoid valve according to the predictive pressure.

2. The method according to claim 1, wherein the acquiring the air charge-release volume of the braking cylinder comprises:
determining the air charge-release volume of the braking cylinder according to a pre-established air charge-release volume model, an acquired ambient temperature and an initial pressure of the braking cylinder.

3. The method according to claim 1, wherein the acquiring the air flowrate of the braking cylinder of the braking cylinder comprises:
determining the air flowrate of the braking cylinder according to a pre-established air flowrate model, the acquired pressure of the braking cylinder and a total air duct pressure.

4. The method according to claim 1, wherein the acquiring the predictive pressure of the braking cylinder comprises:
acquiring a current pressure of the braking cylinder and a pressure hysteresis variation of the braking cylinder, and determining the predictive pressure of the braking cylinder according to the current pressure and the pressure hysteresis variation.

5. The method according to claim 4, wherein the acquiring the pressure hysteresis variation of the braking cylinder comprises:
acquiring a pressure variation slope of the braking cylinder and determining the pressure hysteresis variation according to a pre-established curve relationship between the pressure variation slope and the pressure hysteresis variation.

6. The method according to claim 5, wherein the controlling the working state of the air charge-release solenoid valve according to the predictive pressure comprises:
in case where the predictive pressure is greater than an upper limit of a dead zone range, controlling the air charge-release solenoid valve to release air until the predictive pressure is less than a pressure corresponding to a braking instruction to hold pressure;
in case where the predictive pressure is less than a lower limit of the dead zone range, controlling the air charge-release solenoid valve to charge air until the predictive pressure is greater than a pressure corresponding to a braking instruction to hold pressure.

7. A pressure control device for a braking cylinder of a rail vehicle, comprising:
an acquiring module, configured to acquire an air charge-release volume of the braking cylinder and an air flowrate of the braking cylinder;
a first controlling module, configured to determine an air charge-release duration according to the air charge-release volume of the braking cylinder and the air flowrate of the braking cylinder, and control a charge-release working duration of an air charge-release solenoid valve according to the air charge-release duration; and
a second controlling module, configured to, in case where the charge-release working duration of the air charge-release solenoid valve reaches the charge-release duration, acquire a predictive pressure of the braking cylinder, and control a working state of the air charge-release solenoid valve according to the predictive pressure.

8. The device according to claim 7, wherein the acquisition module is configured to:
determine the air charge-release volume of the braking cylinder according to a pre-established air charge-release volume model, an acquired ambient temperature and an initial pressure of the braking cylinder.

9. The device according to claim 7, wherein the acquisition is configured to:
determine the air flowrate of the braking cylinder according to a pre-established air flowrate model, an acquired pressure of the braking cylinder and a total air duct pressure.

10. The device according to claim 7, wherein the second controlling module is configured to:
acquire a current pressure and a pressure hysteresis variation of the braking cylinder, and determine the predictive pressure of the braking cylinder according to the current pressure and the pressure hysteresis variation.

11. The device according to claim 10, wherein the second controlling module is configured to:
acquire a pressure variation slope of the braking cylinder and determine the pressure hysteresis variation according to a pre-established curve relationship between the pressure variation slope and the pressure hysteresis variation.

12. The device according to claim 11, wherein the second controlling module is configured to:
in case where the predictive pressure is greater than an upper limit of a dead zone range, control the air charge-release solenoid valve to release air until the predictive pressure is less than a pressure corresponding to a braking instruction to hold the pressure;
in case where the predictive pressure is less than a lower limit of the dead zone range, control the air charge-release solenoid valve to charge air until the predictive pressure is greater than a pressure corresponding to a braking instruction to hold the pressure.

13. A rail vehicle, comprising:
a braking cylinder of the rail vehicle and a pressure control device, wherein the pressure control device is connected with the braking cylinder;
wherein the pressure control device comprises:
an acquiring module, configured to acquire an air charge-release volume of the braking cylinder and an air flowrate of the braking cylinder;
a first controlling module, configured to determine an air charge-release duration according to the air charge-release volume of the braking cylinder and the air flowrate of the braking cylinder, and control a charge-release working duration of an air charge-release solenoid valve according to the air charge-release duration; and
a second controlling module, configured to, in case where the charge-release working duration of the air charge-release solenoid valve reaches the charge-release duration, acquire a predictive pressure of the braking cylinder, and control a working state of the air charge-release solenoid valve according to the predictive pressure.

14. The rail vehicle according to claim 13, wherein the acquisition module is configured to:
determine the air charge-release volume of the braking cylinder according to a pre-established air charge-release volume model, an acquired ambient temperature and an initial pressure of the braking cylinder.

15. The rail vehicle according to claim 13, wherein the acquisition is configured to:
determine the air flowrate of the braking cylinder according to a pre-established air flowrate model, an acquired pressure of the braking cylinder and a total air duct pressure.

16. The rail vehicle according to claim 13, wherein the second controlling module is configured to:

acquire a current pressure and a pressure hysteresis variation of the braking cylinder, and determine the predictive pressure of the braking cylinder according to the current pressure and the pressure hysteresis variation.

17. The rail vehicle according to claim 16, wherein the second controlling module is configured to:
acquire a pressure variation slope of the braking cylinder and determine the pressure hysteresis variation according to a pre-established curve relationship between the pressure variation slope and the pressure hysteresis variation.

18. The rail vehicle according to claim 17, wherein the second controlling module is configured to:
in case where the predictive pressure is greater than an upper limit of a dead zone range, control the air charge-release solenoid valve to release air until the predictive pressure is less than a pressure corresponding to a braking instruction to hold the pressure;
in case where the predictive pressure is less than a lower limit of the dead zone range, control the air charge-release solenoid valve to charge air until the predictive pressure is greater than a pressure corresponding to a braking instruction to hold the pressure.

* * * * *